United States Patent
Huang et al.

(10) Patent No.: US 8,755,018 B2
(45) Date of Patent: Jun. 17, 2014

(54) LIQUID CRYSTAL DISPLAY MOTHER PANEL COMPRISING PRIMARY SPACERS AND SECONDARY SPACERS WHEREIN THE PRIMARY SPACERS ARE SURROUNDED BY A PRIMARY SEALANT ELEMENT

(75) Inventors: Dongsheng Huang, Beijing (CN); Kai Zhao, Beijing (CN)

(73) Assignee: Beijing Boe Optoelectronics Technology Co., Ltd., Beijing (CN)

(*) Notice: Subject to any disclaimer, the term of this patent is extended or adjusted under 35 U.S.C. 154(b) by 232 days.

(21) Appl. No.: 12/875,579

(22) Filed: Sep. 3, 2010

(65) Prior Publication Data

US 2011/0058137 A1 Mar. 10, 2011

(30) Foreign Application Priority Data

Sep. 7, 2009 (CN) .................... 2009 1 0092365

(51) Int. Cl.
*G02F 1/1339* (2006.01)

(52) U.S. Cl.
USPC .......................................................... 349/155

(58) Field of Classification Search
CPC ............. G02F 1/13392; G02F 1/1341; G02F 2001/13396
USPC ................................................ 349/155–157
See application file for complete search history.

(56) References Cited

U.S. PATENT DOCUMENTS

| | | | |
|---|---|---|---|
| 2003/0025868 A1 | 2/2003 | Hiroshima et al. | |
| 2004/0257518 A1* | 12/2004 | Jang et al. | 349/155 |
| 2004/0263765 A1* | 12/2004 | Han et al. | 349/155 |
| 2005/0253994 A1* | 11/2005 | Kamijima et al. | 349/155 |
| 2006/0152668 A1* | 7/2006 | Jang et al. | 349/156 |
| 2007/0085965 A1 | 4/2007 | Manabe | |

FOREIGN PATENT DOCUMENTS

| | | |
|---|---|---|
| CN | 1400500 A | 3/2003 |
| CN | 201032509 Y | 3/2008 |
| KR | 2002-0054870 A | 7/2002 |
| KR | 2004-0011671 A | 2/2004 |
| KR | 2007-0042456 A | 4/2007 |
| KR | 2007-0109079 A | 11/2007 |

* cited by examiner

*Primary Examiner* — Paul Lee

(74) *Attorney, Agent, or Firm* — Ladas & Parry LLP

(57) ABSTRACT

An embodiment of the present invention provides a liquid crystal display mother panel comprising: a color filter substrate; an array substrate opposite to the color filter substrate; and a primary sealant element, a secondary sealant element, primary spacers and secondary spacers disposed between the color filter substrate and the array substrate. The secondary spacers have a height different from that of the primary spacers, and the primary spacers and the secondary spacers maintain a same distance between the color filter substrate and the array substrate when they are against structural layers on the two substrates, respectively.

6 Claims, 4 Drawing Sheets

US 8,755,018 B2

LIQUID CRYSTAL DISPLAY MOTHER PANEL COMPRISING PRIMARY SPACERS AND SECONDARY SPACERS WHEREIN THE PRIMARY SPACERS ARE SURROUNDED BY A PRIMARY SEALANT ELEMENT

BACKGROUND

Embodiments of the present invention relate to a liquid crystal display (LCD) mother panel and a method of manufacturing the same.

Thin film transistor-liquid crystal displays (TFT-LCDs) have been becoming more and more popular because of its merits such as small volume, low power consumption, no radiation and low cost.

A TFT-LCD comprises a color filter substrate and an array substrate arranged opposite to each other. During attaching the color filter substrate and the array substrate to each other during manufacture of the TFT-LCD, some members, including primary spacers, secondary spacers, a primary sealant element and a secondary sealant element, can be interposed between the two substrates so as to support and maintain a uniform distance between the two substrates.

FIG. 1 is a schematic view illustrating a structure obtained by attaching the color filter substrate to the array substrate, and FIG. 2 is a sectional view of a conventional structure by attaching a color filter substrate and an array substrate taken along a line A-A in FIG. 1.

Referring to FIGS. 1 and 2, a mother panel 100 comprising the color filter substrate 1, the array substrate 2 and members between the color filter substrate 1 and the array substrate 2 includes a plurality of panels 3. A primary sealant element 4 is disposed at periphery of each individual panel 3, and primary spacers 5 are dispersed in a region (i.e., display region) surrounded by the primary sealant element 4. The primary spacers 5 serve to maintain a uniform distance between the color filter substrate 1 and the array substrate 2 in each individual panel 3 after the attaching. Meanwhile, a secondary sealant element 6 is disposed between adjacent individual panels 3 and outside each individual panel 3, that is, at a dummy region of the LCD mother panel 100. Secondary spacers 7 are dispersed between the secondary sealant element 6 and the primary sealant element 4 so as to maintain a uniform distance between the color filter substrate 1 and the array substrate 2 attached to each other at a region between adjacent panels 3. Liquid crystal material is filled in the space surrounded by the primary sealant element 4 between the color filter substrate 1 and the array substrate 2.

With performing a vacuum-attaching step for the above described LCD mother panel 100, there are following problems: when the vacuum state is broken and the LCD mother panel 100 is in the air, the substrate is subject to different supporting force at both sides of the primary sealant element 4 due to same atmospheric pressure but different spacers at both sides of the primary sealant element 4, as shown in FIG. 3. It may cause that the individual panel 3 has a varying thickness in the peripheral region (about the primary sealant element 4) and thus liquid crystal molecules are aligned abnormally, deteriorating display quality of the LCD panel.

SUMMARY

An embodiment of the present invention provides a liquid crystal display mother panel including at least one panel, the mother panel comprising: a color filter substrate; an array substrate opposite to the color filter substrate; and a primary sealant element, a secondary sealant element, primary spacers and secondary spacers disposed between the color filter substrate and the array substrate, wherein the primary sealant element is disposed along a periphery of the at least one panel, the primary spacers are disposed in a region surrounded by the primary sealant element, the secondary sealant element is disposed outside the at least one panel, and the secondary spacers are disposed between the primary sealant element and the secondary sealant element, and wherein the secondary spacers have a height different from that of the primary spacers, and the primary spacers and the secondary spacers maintain a same distance between the color filter substrate and the array substrate when they are against structural layers on the two substrates, respectively.

Another embodiment of the present invention provides a method for manufacturing a liquid crystal display mother panel including at least one panel, the method comprising: depositing a spacer material on a substrate and then performing an exposing process, wherein a region corresponding to a secondary spacer is not exposed, a region corresponding to a primary spacer is half-exposed, and a remaining region is fully exposed, such that the primary spacer and the secondary spacer are formed on the substrate, he primary spacer has a height from that of the secondary spacer, the primary spacer is disposed inside the at least one panel, and the secondary spacer is disposed outside the at least one panel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

The embodiments of the invention now will be described more fully hereinafter with reference to the accompanying drawings, in which the embodiments of the invention are shown. Apparently, only some embodiments of the present invention are described here, and the present invention may be embodied in other forms. All of other embodiments made by those skilled in the art based on the embodiments disclosed herein without any inventive work fall within the scope of the present invention.

A liquid crystal display mother panel and a method for forming the liquid crystal display mother panel according to embodiments of the present invention will be described in detail with reference to the accompanying drawings.

Figure 1:
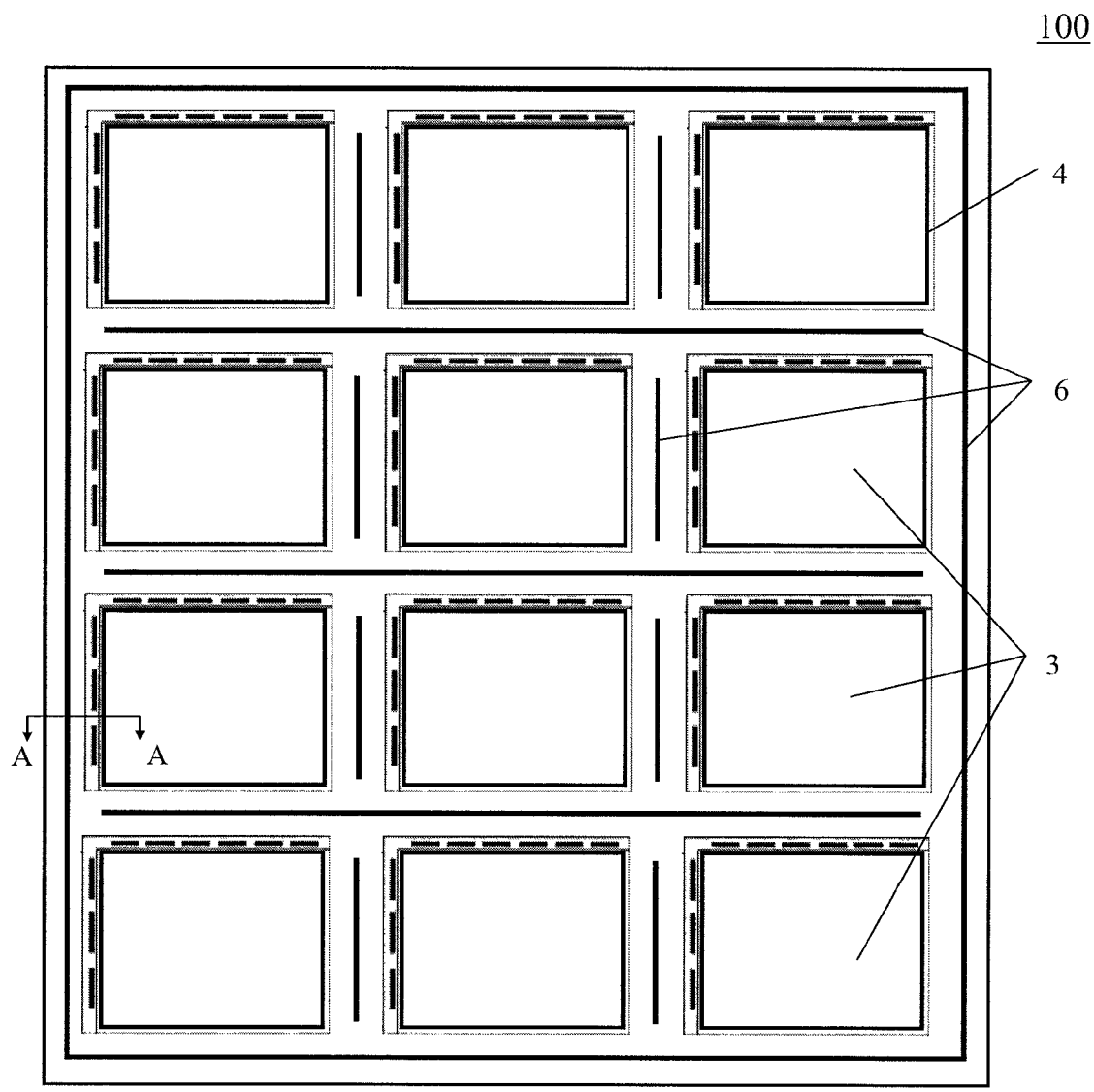
FIG. 1 is a schematic view illustrating a structure obtained by attaching the color filter substrate and the array substrate.
Figure 2:
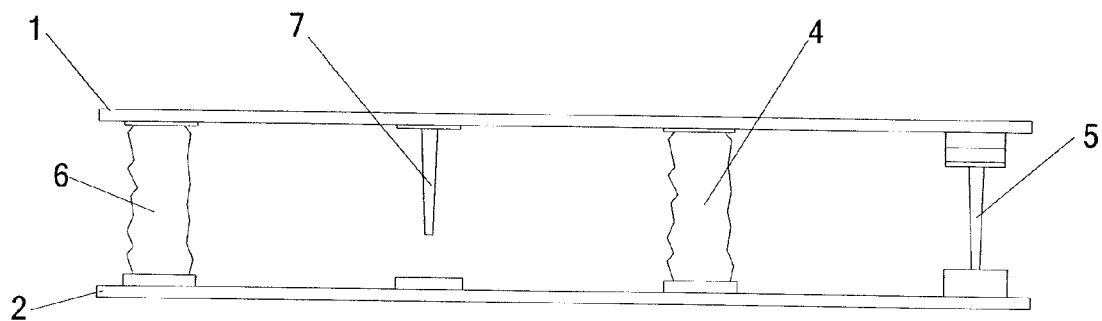
FIG. 2 is a sectional view taken along a line A-A in FIG. 1, showing a conventional liquid crystal display mother panel after an ideal attaching step.
Figure 3:
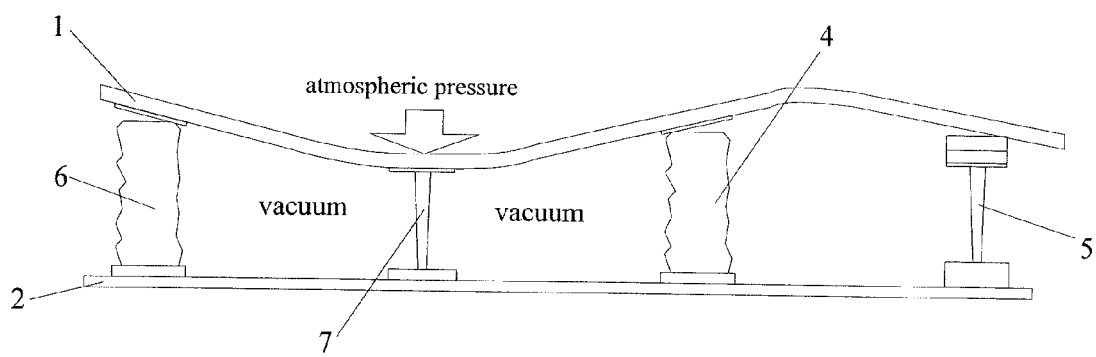
FIG. 3 is a sectional view taken along a line A-A in FIG. 1, showing a conventional liquid crystal display mother panel after an actual attaching step.
Figure 4:
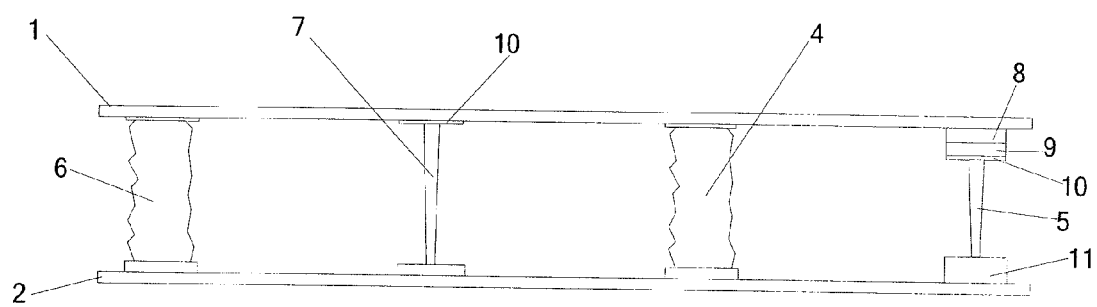
FIG. 4 is a sectional view taken along a line A-A in FIG. 1, showing a liquid crystal display mother panel after an attaching step according to an exemplary embodiment of the present invention.

Referring to FIG. 4, an exemplary embodiment of the present invention provides a liquid crystal display mother panel including at least one individual panel 3, for example, twelve panels 3. The mother panel comprises a color filter substrate 1, an array substrate 2 facing the color filter substrate 1, and primary sealant elements 4, secondary sealant elements 6, primary spacers 5 and secondary spacers 7 disposed between the color filter substrate 1 and the array substrate 2. Each primary sealant element 4 is formed along a periphery of each panel 3, and liquid crystal material is filled in the region (display region) surrounded by the primary sealant element 4. The primary spacers 5 are disposed in the region (display region) surrounded by the primary sealant element 4 and serve to maintain an uniform distance between the color filter substrate 1 and the array substrate 2 attached to each other in the region of each individual panel. Each secondary sealant element can be formed between adjacent individual panels 3 or outside each individual panel 3, that is, in a dummy region of the liquid crystal display mother panel. The secondary spacers 7 are dispersed between the primary sealant elements 4 and the secondary sealant elements 6 and serve to maintain an uniform distance between the color filter substrate 1 and the array substrate 2 attached to each other in the region between adjacent individual panels. The secondary spacers 7 have a height different from that of the primary spacers 5, and the secondary spacers 7 maintain the same distance between the color filter substrate 1 and the array substrate 2 as the primary spacers 5 do when the secondary spacers 7 and the primary spacers 5 each are pressed against a structural layer on the color filter substrate 1 and a structural layer on the array substrate 2.

After formation, the mother panel is cut into separated individual panels 3. The individual panels 3 are used to manufacture liquid crystal display devices.

In the present embodiment, the secondary spacers 7 and the primary spacers 5 each are pressed against a structural layer on the color filter substrate 1 and a structural layer on the array substrate 2 in following two ways.

(a) The secondary spacers 7 are pressed directly against the glass base substrates (not shown) of the color filter substrate 1 and the array substrate 2, and the primary spacers 5 are pressed against members formed on the color filter substrate 1 and the array substrate 2 corresponding to the primary spacers 5 (as shown in FIG. 4, for example, one end of each primary spacer 5 is pressed against a black matrix on the color filter substrate 1 and the other end thereof is pressed against a thin film transistor 11);

(b) The second spacers 7 are pressed against the indium tin oxide (ITO) layers respectively formed on the color filter substrate 1 and the array substrate 2 (as shown in FIG. 4), while the primary spacers 5 are pressed against members formed on the color filter substrate 1 and the array substrate 2 corresponding to the primary spacers 5 (as shown in FIG. 4, for example, one end of a primary spacer 5 is pressed against a black matrix on the color filter substrate 1 and the other end thereof is pressed against a thin film transistor 11).

As shown in FIG. 4, the primary spacers 5 dispersed in the regions surrounded by the primary sealant elements 4 are deposited on the black matrix 8, a color filter resin layer 9 and a transparent electrode 10 of the color filter substrate 1, and the distal ends thereof can be pressed against the thin film transistors 11 of the array substrate in each individual panel so as to maintain a distance between the color filter substrate 1 and the array substrate 2 attached to each other in an individual panel. The secondary spacers 7 dispersed between the primary sealant element 4 and the secondary sealant element 6 are directly deposited on the transparent electrode 10 of the color filter substrate 1 and the distal ends thereof are pressed against a pixel electrode layer in a dummy region on the array substrate 2 so as to maintain an uniform distance between the color filter substrate 1 and the array substrate 2 attached to each other in the dummy region of the liquid crystal display mother panel.

Please note that FIG. 4 shows only relationship between positions of the primary sealant element 4, the secondary sealant element 6, the primary spacers 5 and the secondary spacers 7 and positions of the color filter substrate 1 and the array substrate 2 in a way of example, but is not intended to limit the specific size and disposition density of the secondary spacers 7, and shown in FIG. 4 is only a part of the region surrounded by the primary sealant. There may be many secondary spacers 7 dispersed between the primary sealant element 4 and the secondary sealant element 6, rather than only one shown in the drawing. FIG. 4 shows only structural layers on the color filter substrate 1 and the array substrate 2 in a region corresponding to the primary sealant element 4, the secondary sealant element 6, the primary spacers 5 and the secondary spacers 7, and other members are omitted for clarity and simplicity.

In the liquid crystal display mother panel according to the embodiment of the present invention, the primary spacers and the secondary spacers disposed between the color filter substrate and the array substrate have a height difference such that they maintain a same distance between the color filter substrate and the array substrate when they are pressed against structural layers on the color filter substrate and the array substrate. Thus, when the mother panel is exposed to atmosphere after the attaching process, a pressure on an inner surface of the substrate is the same as that on an outer surface of the substrate in the peripheral region of an individual panel (inside and outside the primary sealant element). As a result, the color filter substrate and the array substrate each maintain an excellent flatness and each individual panel included in the mother panel has a uniform thickness in the peripheral region thereof.

EXAMPLE 1

Figure 5:
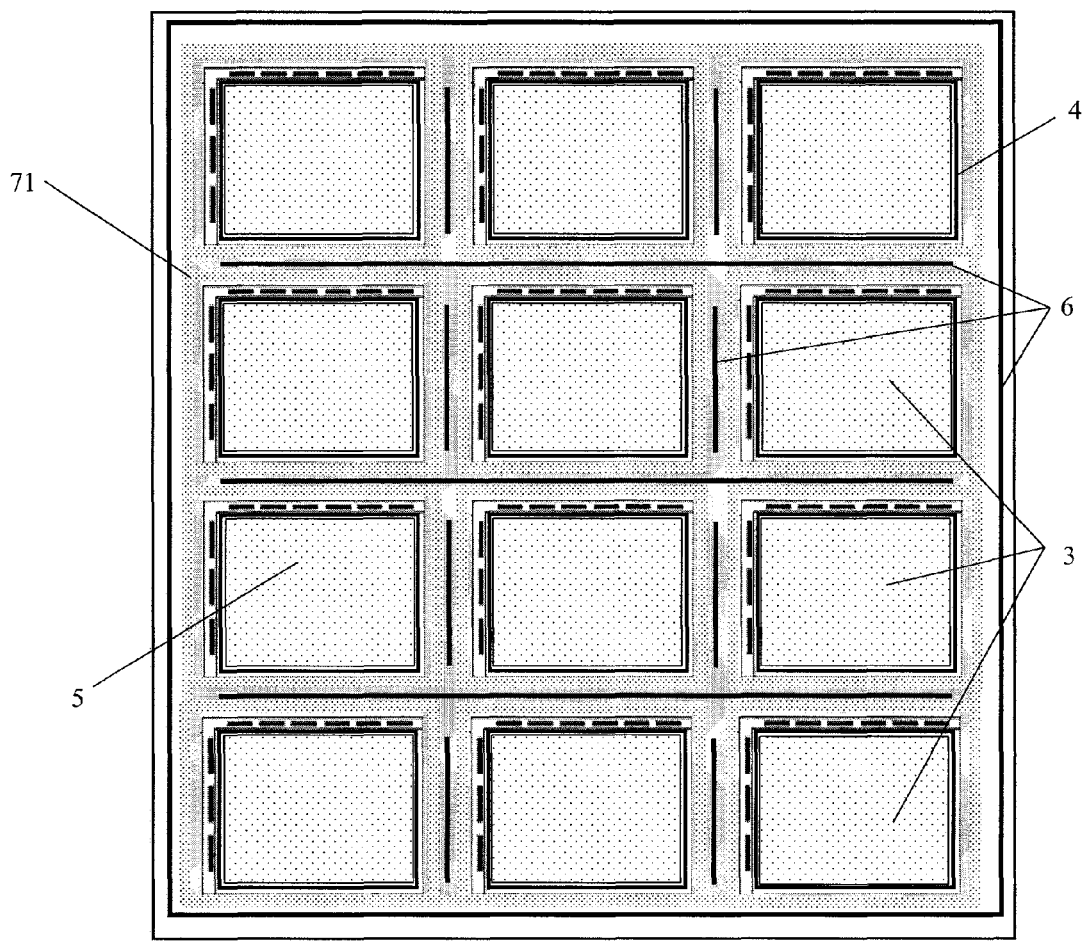
FIG. 5 is a schematic view showing a structure of a liquid crystal display mother panel after an attaching step according to a first embodiment of the present invention.

Referring to FIGS. 4 and 5, the present example provides a liquid crystal display mother panel 200 comprising twelve individual panels 3. The secondary spacers 71 disposed between the primary sealant element 4 and the secondary sealant element 6 are all post-shaped spacers. Each secondary spacer 71 has a bottom deposited on the color filter substrate 1 and a top supported on the array substrate 2.

In the present example, the bottom of each secondary spacer 71 has a cross-sectional area larger than that of the bottom of each primary spacer 5, and the secondary spacers 71 are dispersed in a density larger than that of the primary spacers 5. In addition to the primary spacers 5, the liquid crystal material filled in the region surrounded by the primary sealant element 4 (i.e., in an individual panel 3) also serves to maintain a distance between the color filter substrate and the array substrate. So, the contact area between the secondary spacers 71 and the substrate in the dummy region is increased such that the atmospheric pressure on the substrate and the supporting force from the spacers is more balanceable in the peripheral region of an individual panel 3 (inside and outside the primary sealant element 4) and thus the distance between the color filter substrate and the array substrate may be maintained uniformly in the peripheral region of the individual panel 3.

In the liquid crystal display mother panel 200 according to the present example, between the color filter substrate and the array substrate, the primary spacers 5 have a height for that of the secondary spacers 71 disposed such that they maintain a same distance between the color filter substrate and the array substrate when these spacers are pressed against structural layers on the color filter substrate and the array substrate; and the contact area between the secondary spacers 71 and the substrate in the dummy region can be increased by increasing the cross-sectional area of the bottom of each secondary spacer and/or the dispensation density of the secondary spacers. Thus, when the mother panel is exposed to atmosphere after the attaching process, a pressure on an inner surface of the substrate is the same as that on an outer surface of the substrate in a peripheral region of an individual panel (inside and outside the primary sealant element). As a result, the color filter substrate and the array substrate each maintain an excellent flatness, and each individual panel 3 included in the mother panel 200 has a uniform thickness in the peripheral region thereof.

EXAMPLE 2

Figure 6:
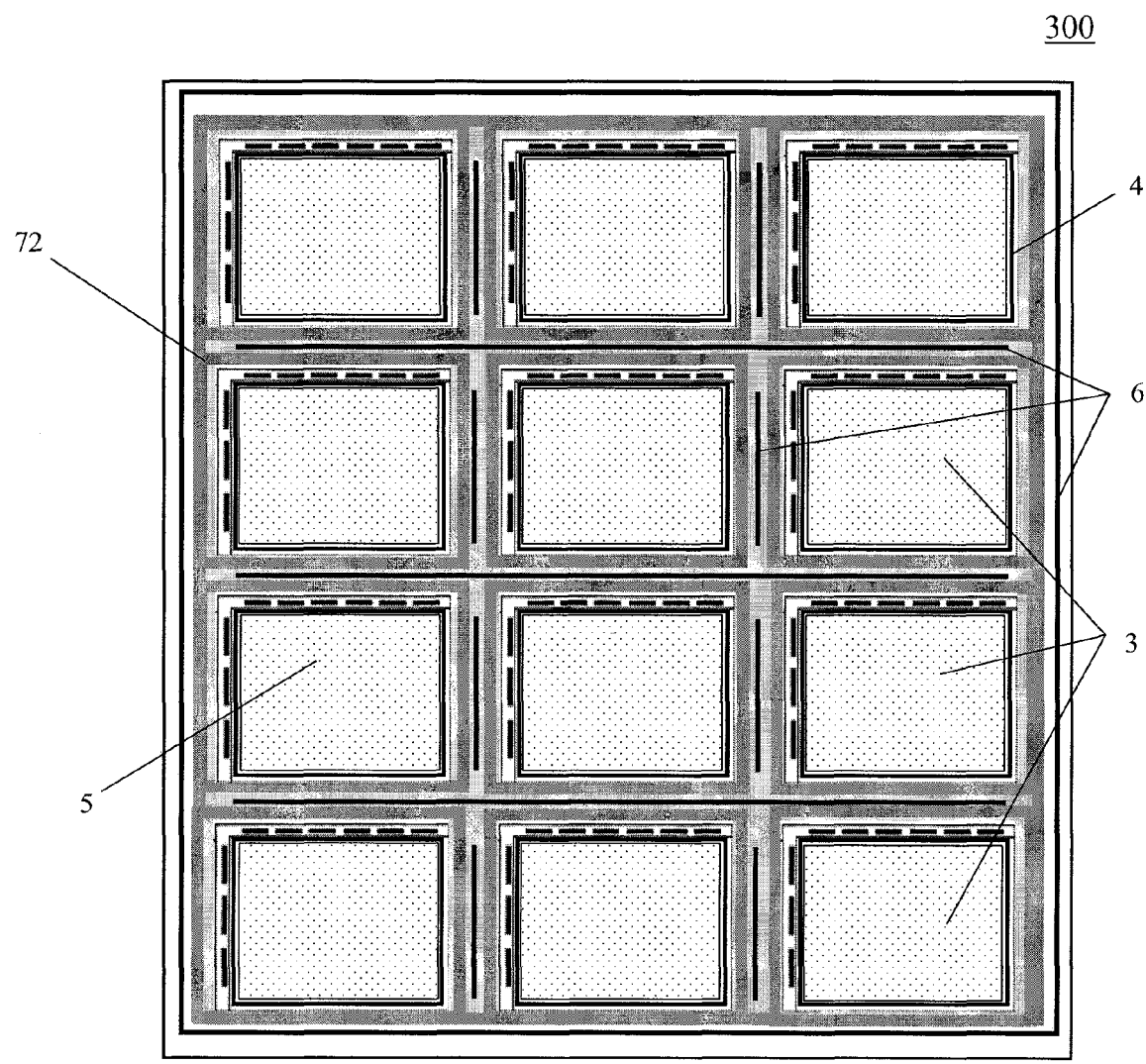
FIG. 6 is a schematic view showing a structure of a liquid crystal display mother panel after an attaching step according to a second embodiment of the present invention.

With reference to FIGS. 4 and 6, the present example provides a liquid crystal display mother panel 300 comprising, for example, twelve individual panels 3. The secondary spacers disposed between the primary sealant element 4 and the secondary sealant element 6 are stripe-like wall spacers 72. Each secondary spacer 72 has a bottom deposited on the color filter substrate 1 and a top supported on the array substrate 2.

In some cases, openings may be formed on the secondary sealant element 6 so as to allow air to pass therethrough into the dummy region of the liquid crystal display mother panel when the color filter substrate and array substrate, which are attached together, are open to atmosphere. In this way, the air pressure become the same inside the substrates as outside the substrates, which, in combination with supporting of the stripe-like wall spacers 72 disposed in the dummy region, maintain a uniform thickness in the peripheral region of the individual panel 3. Since the secondary spacer 72 is of a stripe-like wall structure, it may act as a bank to resist against impact of air flow entering into the dummy region upon the primary sealant element 4. Thus, defects such as bubble may be prevented in the display region from occurring due to damage or crack of the primary sealant element 4 caused by impact of the air flow.

In the liquid crystal display mother panel 300 according to the present example, between the color filter substrate and the array substrate, the primary spacers 5 have a height different from that of the secondary spacers 72 such that the spacers maintain a same distance between the color filter substrate and the array substrate when they are pressed against structural layers on the color filter substrate and the array substrate. Thus, when the mother panel is exposed to atmosphere after the attaching process, a pressure on an inner surface of the substrate become the same as that on an outer surface of the substrate in a peripheral region of an individual panel 3 (inside and outside the primary sealant element). As a result, the color filter substrate and the array substrate each maintain an excellent flatness and each individual panel 3 included in the mother panel 300 has a uniform thickness in the peripheral region thereof. In addition, the secondary spacer 72 is provided with a stripe-like wall shape so as to reduce impact of air flow rushing into the dummy region to the primary sealant element, preventing air bubble from occurring in the display region.

In the above examples, the liquid crystal display mother panel is described in a form that the primary spacers and the secondary spacers are formed on the color filter substrate, but the present invention is not limited thereto. For example, the primary spacers and the secondary spacers may be formed on the array substrate or on both the color filter substrate and the array substrate, respectively, during manufacture of the liquid crystal display mother panel.

An embodiment of the present invention further provides a method for forming a liquid crystal display mother panel comprising: depositing a spacer material on a substrate and then performing an exposing processes, wherein a secondary spacer area is not exposed, a primary spacer area is half-exposed, and a remaining area is fully exposed, such that a secondary spacer and a primary spacer are formed on the substrate after development, and the secondary spacer has a height different from that of the primary spacer.

Specifically, the above process for forming the liquid crystal display mother panel can be performed as follows.

S1, depositing a spacer material on a substrate.

The spacer material may be formed on a color filter substrate or an array substrate by a chemical vapor deposition (CVD) process, and the spacer material may comprise photoresist or the like.

In a conventional liquid crystal display mother panel, the primary spacer typically has a height in a range of about 3-4 μm; in the embodiment of the present invention, however, the height of the spacers is controlled by the exposing processes. Accordingly, in an embodiment of the present invention, the spacer material deposited on the substrate has a thickness in a range of about 6-7 μm so as to obtain a primary spacer having a height of about 3-4 μm.

Specific heights of the primary spacer and the secondary spacer may be determined according to position thereof during manufacturing.

S2, exposing the spacer material on the substrate.

In this step, a secondary spacer area is not exposed, a primary spacer area is half-exposed, and a remaining area is fully exposed, such that a secondary spacer and a primary spacer are formed with different heights on the substrate.

In exposing the region containing the primary spacer, an exposing process with a slit mask or a half-tone mask may be used. No matter which exposing process is used, height of the primary spacer may be adjusted by controlling exposing time and light intensity. In order for having two ends of a primary spacer just press against two substrates, the height of the primary spacer may be controlled in a range of 3-4 μm by the exposing process and after development.

The primary spacer and the secondary spacer may be formed with different heights on the substrate by above steps, completing manufacture of the substrate. Then, a series of processes such as coating, curing and rubbing of an alignment film and attaching the two substrates together are performed so as to complete the liquid crystal display mother panel.

In the method of forming a liquid crystal display mother panel according to an embodiment of the present invention, the primary spacers and the secondary spacers are formed between the color filter substrate and the array substrate have different heights so that they maintain a same distance the two substrates when they are against structural layers on the two substrates. When the mother panel thus formed is exposed to atmosphere after the attaching process, the air pressure is the same and the supporting force on the substrate is also the same in a peripheral region of an individual panel (inside and outside the primary sealant element). As a result, the color filter substrate and the array substrate each maintain an excellent flatness and each individual panel included in the mother panel has a uniform thickness in the peripheral region thereof.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display mother panel including at least one panel, the mother panel comprising:
    a color filter substrate;
    an array substrate opposite to the color filter substrate; and
    a primary sealant element, a secondary sealant element, primary spacers and secondary spacers disposed between the color filter substrate and the array substrate,
    wherein the primary sealant element is disposed along a periphery of the at least one panel, the primary spacers are disposed in a region surrounded by the primary sealant element, the secondary sealant element is disposed outside the at least one panel, and the secondary spacers are disposed between the primary sealant element and the secondary sealant element, and
    wherein the secondary spacers have a height different from that of the primary spacers, and the secondary spacers maintain a distance between the color filter substrate and the array substrate the same as a distance the primary spacers maintain between the color filter and the array substrate when the secondary spacers are pressed directly against glass base substrates of the color filter substrate and the array substrate and the primary spacers are against structural layers on the two substrates, so that the color filter substrate has a planar outer surface both beside and outside of the at least one panel, and the at least one panel has a uniform thickness in the peripheral region thereof.

2. The liquid crystal display mother panel of claim 1, wherein the secondary spacers are post spacers.

3. The liquid crystal display mother panel of claim 2, wherein the secondary spacers has a bottom area larger than that of the primary spacers.

4. The liquid crystal display mother panel of claim 2, wherein the secondary spacers are dispersed more densely than the primary spacers are.

5. The liquid crystal display mother panel of claim 1, wherein the secondary spacers are stripe-like wall spacers.

6. The liquid crystal display mother panel of claim 1, wherein the secondary spacers are formed on the color filter substrate or the array substrate.

* * * * *